US012613884B1

(12) United States Patent
Mathur et al.

(10) Patent No.: US 12,613,884 B1
(45) Date of Patent: Apr. 28, 2026

(54) SYSTEM AND METHOD FOR REAL-TIME MONITORING OF DATA REPLICATION FOR HIGH AVAILABILITY

(71) Applicant: Bank of America Corporation, Charlotte, NC (US)

(72) Inventors: Tarun Mathur, Plainsboro, NJ (US); Nirav G. Amin, West Windsor, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/036,257

(22) Filed: Jan. 24, 2025

(51) Int. Cl.
*G06F 16/27* (2019.01)
*G06F 11/30* (2006.01)

(52) U.S. Cl.
CPC .......... *G06F 16/27* (2019.01); *G06F 11/3006* (2013.01)

(58) Field of Classification Search
CPC ...... G06F 16/27; G06F 16/273; G06F 16/275; G06F 16/278; G06F 11/3006
USPC ........................................................ 707/610
See application file for complete search history.

(56) References Cited

U.S. PATENT DOCUMENTS

| | | | |
|---|---|---|---|
| 8,103,906 B1 | 1/2012 | Alibakhsh et al. | |
| 8,589,574 B1 | 11/2013 | Cormie et al. | |
| 9,880,970 B2 | 1/2018 | Bain | |
| 10,261,961 B2 | 4/2019 | Jose et al. | |
| 10,509,675 B2 * | 12/2019 | Karmarkar | G06F 9/546 |
| 11,880,386 B1 | 1/2024 | Hoffmann et al. | |
| 2013/0066834 A1 | 3/2013 | McAlister et al. | |
| 2015/0088823 A1 * | 3/2015 | Chen | G06F 16/273 |
| | | | 707/626 |
| 2016/0203202 A1 | 7/2016 | Merriman et al. | |
| 2018/0067822 A1 | 3/2018 | McAlister et al. | |
| 2018/0096045 A1 | 4/2018 | Merriman et al. | |
| 2018/0239677 A1 | 8/2018 | Chen et al. | |
| 2018/0349178 A1 * | 12/2018 | Painter | G06F 9/5083 |
| 2019/0347352 A1 | 11/2019 | Gochkov et al. | |
| 2020/0334113 A1 | 10/2020 | Sanakkayala et al. | |
| 2021/0157628 A1 | 5/2021 | Dornemann et al. | |
| 2022/0318105 A1 | 10/2022 | Subramanian et al. | |
| 2024/0205073 A1 | 6/2024 | Rath et al. | |

* cited by examiner

*Primary Examiner* — Michael Pham

(57) ABSTRACT

A system is configured to receive messages from an external device hosting a database. A replicator processes a selected message using one of a plurality of jobs that analyze the target data in the selected message to determine target databases to record data associated with the selected message. The job stores the associated record data in the appropriate target databases, and a message processing rate is determined for that job. Using the message processing rate for all of the jobs, the total number of messages that the jobs are able to process in a predetermined period is determined. The current number of pending messages is also determined. An efficiency parameter is determined by subtracting the total number of messages that the jobs are able to process from the current number of pending messages. An additional job is started when the efficiency parameter is less than a predetermined threshold.

20 Claims, 5 Drawing Sheets

METHOD 300

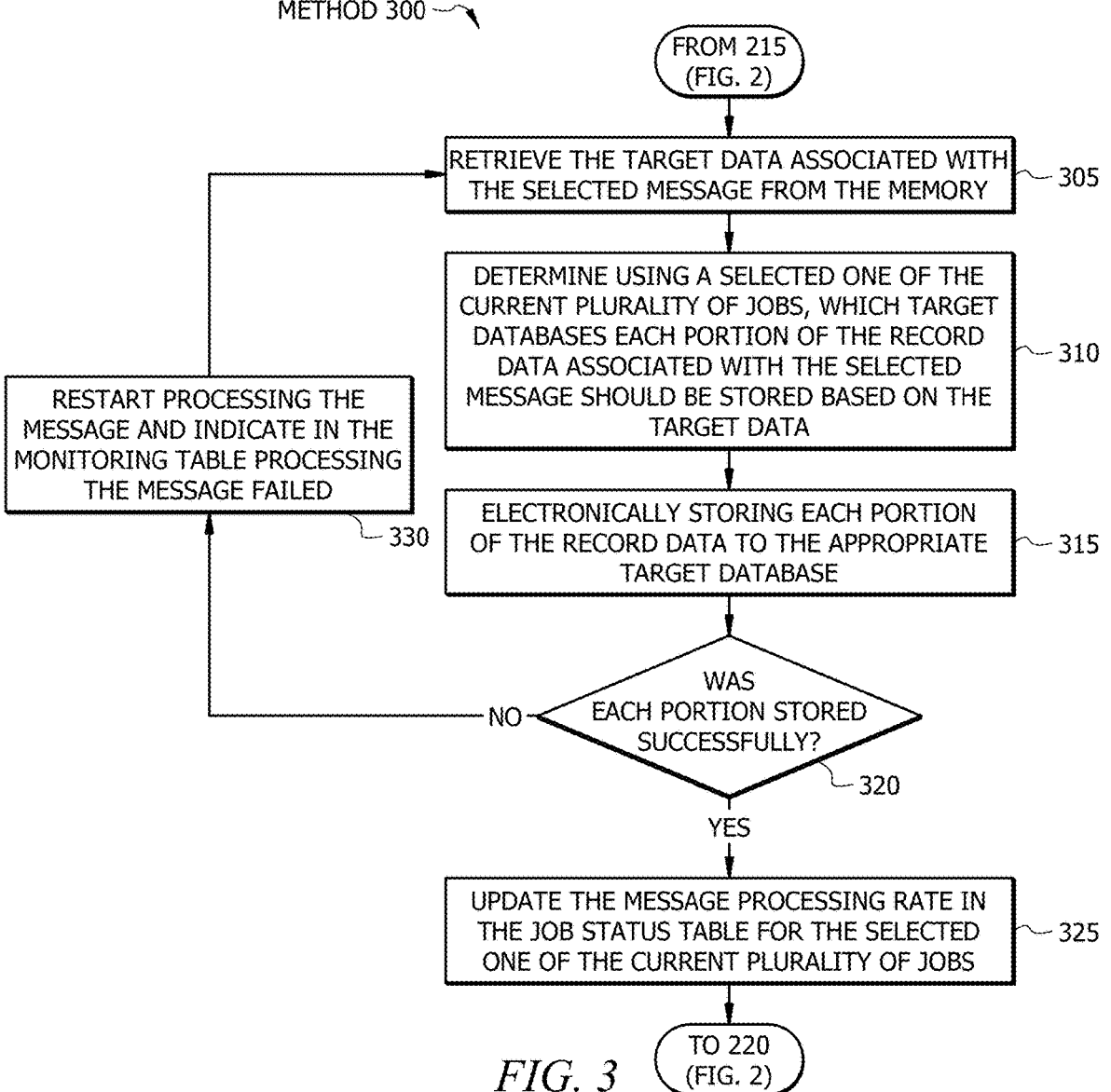

FROM 215
(FIG. 2)

RETRIEVE THE TARGET DATA ASSOCIATED WITH THE SELECTED MESSAGE FROM THE MEMORY — 305

DETERMINE USING A SELECTED ONE OF THE CURRENT PLURALITY OF JOBS, WHICH TARGET DATABASES EACH PORTION OF THE RECORD DATA ASSOCIATED WITH THE SELECTED MESSAGE SHOULD BE STORED BASED ON THE TARGET DATA — 310

ELECTRONICALLY STORING EACH PORTION OF THE RECORD DATA TO THE APPROPRIATE TARGET DATABASE — 315

RESTART PROCESSING THE MESSAGE AND INDICATE IN THE MONITORING TABLE PROCESSING THE MESSAGE FAILED — 330

WAS EACH PORTION STORED SUCCESSFULLY? — 320

NO

YES

UPDATE THE MESSAGE PROCESSING RATE IN THE JOB STATUS TABLE FOR THE SELECTED ONE OF THE CURRENT PLURALITY OF JOBS — 325

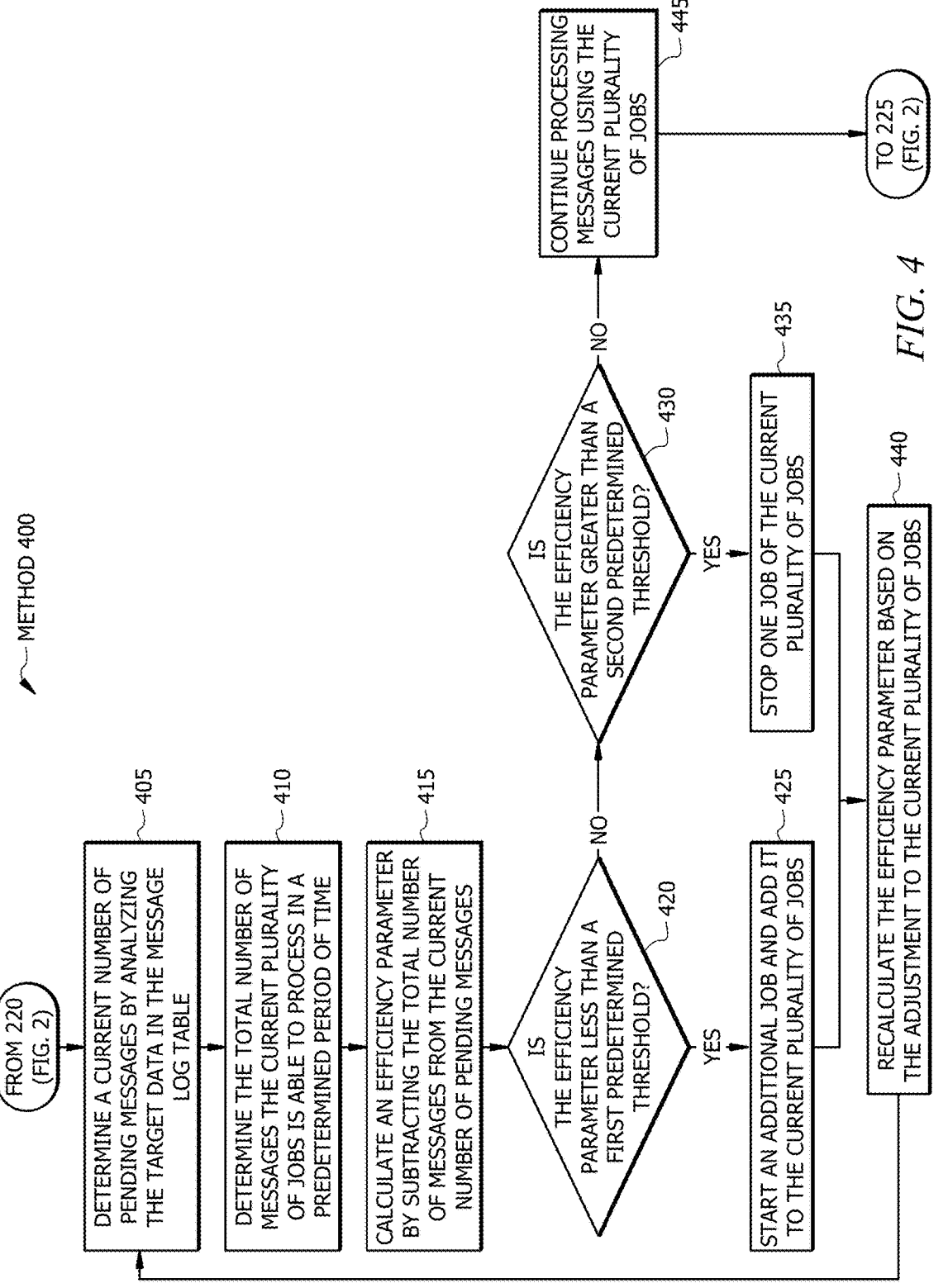

METHOD 400

FROM 220 (FIG. 2)

DETERMINE A CURRENT NUMBER OF PENDING MESSAGES BY ANALYZING THE TARGET DATA IN THE MESSAGE LOG TABLE — 405

DETERMINE THE TOTAL NUMBER OF MESSAGES THE CURRENT PLURALITY OF JOBS IS ABLE TO PROCESS IN A PREDETERMINED PERIOD OF TIME — 410

CALCULATE AN EFFICIENCY PARAMETER BY SUBTRACTING THE TOTAL NUMBER OF MESSAGES FROM THE CURRENT NUMBER OF PENDING MESSAGES — 415

IS THE EFFICIENCY PARAMETER LESS THAN A FIRST PREDETERMINED THRESHOLD? — 420

YES

START AN ADDITIONAL JOB AND ADD IT TO THE CURRENT PLURALITY OF JOBS — 425

NO

IS THE EFFICIENCY PARAMETER GREATER THAN A SECOND PREDETERMINED THRESHOLD? — 430

YES

STOP ONE JOB OF THE CURRENT PLURALITY OF JOBS — 435

RECALCULATE THE EFFICIENCY PARAMETER BASED ON THE ADJUSTMENT TO THE CURRENT PLURALITY OF JOBS — 440

NO

CONTINUE PROCESSING MESSAGES USING THE CURRENT PLURALITY OF JOBS — 445

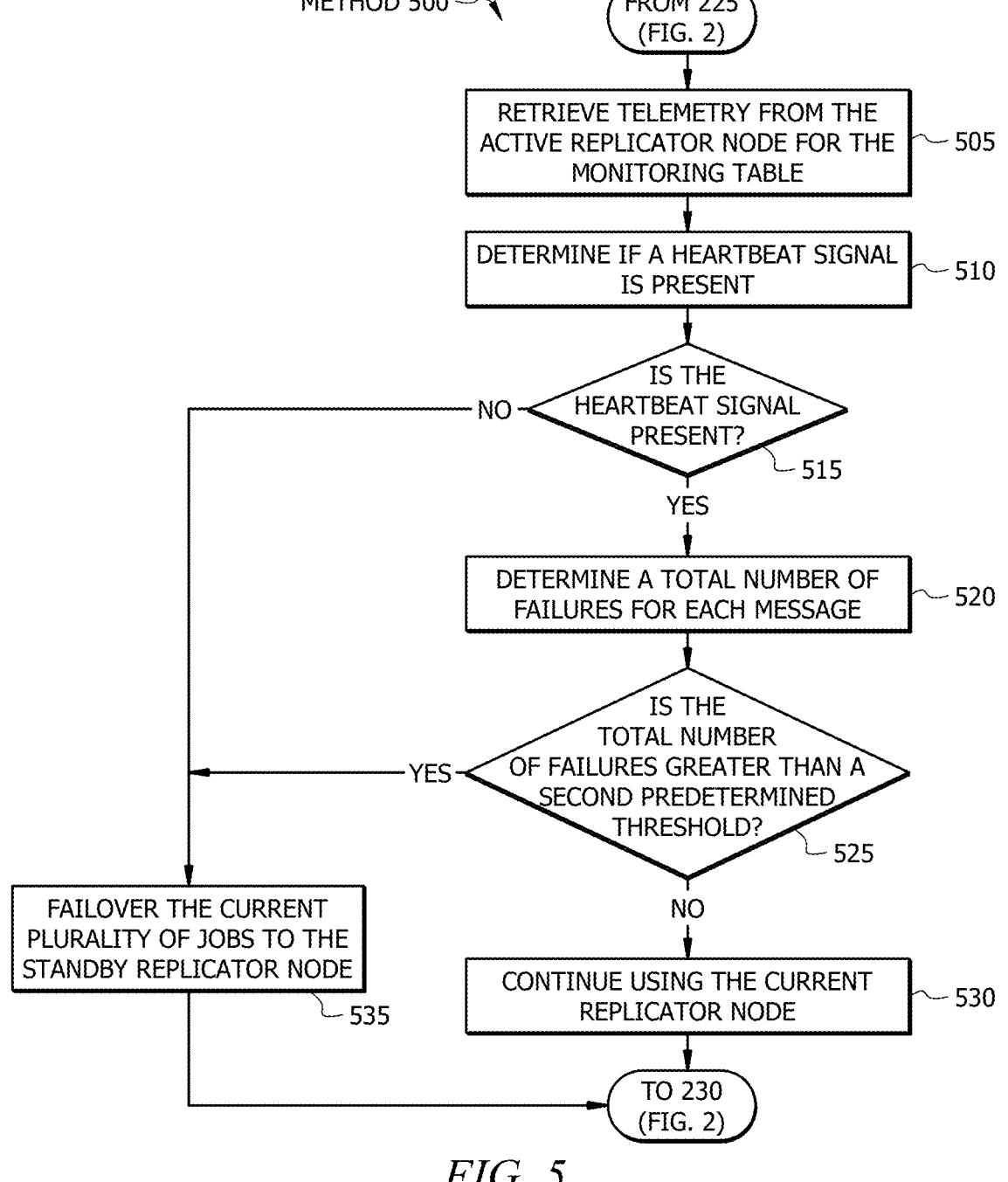

METHOD 500

FROM 225
(FIG. 2)

RETRIEVE TELEMETRY FROM THE
ACTIVE REPLICATOR NODE FOR THE
MONITORING TABLE
— 505

DETERMINE IF A HEARTBEAT SIGNAL
IS PRESENT
— 510

IS THE
HEARTBEAT SIGNAL
PRESENT?
— 515

NO

YES

DETERMINE A TOTAL NUMBER OF
FAILURES FOR EACH MESSAGE
— 520

IS THE
TOTAL NUMBER
OF FAILURES GREATER THAN A
SECOND PREDETERMINED
THRESHOLD?
— 525

YES

NO

FAILOVER THE CURRENT
PLURALITY OF JOBS TO THE
STANDBY REPLICATOR NODE
— 535

CONTINUE USING THE CURRENT
REPLICATOR NODE
— 530

SYSTEM AND METHOD FOR REAL-TIME MONITORING OF DATA REPLICATION FOR HIGH AVAILABILITY

TECHNICAL FIELD

The present disclosure relates generally to network communications between databases, and more specifically, to a system and method for real-time monitoring of data replication for high availability.

BACKGROUND

Organizations commonly use computer databases to store large amounts of data. Such databases provide a convenient means to store and retrieve data used in the organization's day-to-day operations. This data may be distributed across multiple servers in a distributed server architecture.

SUMMARY

Conventional distributed database systems lack a reliable method of performing real-time data replication. When transferring data from a first database, such as a system of record (SOR), to a second database, such as a system of access (SOA), the transfer needs to be made with a robust framework with good fault tolerance. This is especially true when the number of databases increases, and they are located on geographically dispersed servers.

With the increase in the number, size, and geographic distribution of the databases and the servers hosting them, challenges arise in managing their high-volume data loads and ensuring data synchronization. With geographically distributed databases, because of latency introduced by the networks and because of the number of databases, keeping the same data consistent on each database becomes difficult. When data is changed on one database, changes need to be made quickly on the other databases or else two or more databases may contain different information for the same entry. This may result in one or more databases providing incorrect information that may result in losses to an organization or user. Further, due to the volume of data being processed and the general complexity of a distributed database system, errors introduced by system failures or malicious entities may be introduced in data hosted by one database and may propagate to other databases when there is no central authority.

These issues may be addressed using a replicator that manages the replication of the data on one database, such as the SOR, and moves or replicates the data to the second database SOA. The data is transferred from the first database to the second database in the form of messages, which include at least a portion of the information needed. The replicator uses one or more jobs to manage these messages and direct the data to the appropriate databases. Currently, the number of jobs remains static, and there is no method to automatically increase or decrease the number of jobs in real-time based on the current demand. This results in replication slowing or failing at times of high demand or computing power being wasted on unnecessary jobs during periods of low demand.

Certain embodiments of the present disclosure provide a system and method for efficiently processing messages using real-time monitoring to manage the number of jobs based on current demand. Further, certain embodiments ensure that the nodes hosting the jobs function correctly and, when the nodes hosting the jobs are not functioning correctly, migrate the jobs to new nodes. This ensures that the system and method of the present disclosure are able to process messages efficiently with little or no downtime, resulting in a more reliable system. The system and method allow for an organization to use a large distributed database system to provide consistent, low-latency data replication across multiple geographical regions without requiring the use of significant additional computational resources, networks, and/or human resources to ensure that needed data can be quickly and reliably retrieved as needed.

In one or more embodiments, the system and method are configured to receive messages from an external device hosting a database. A replicator processes a selected message using one of a plurality of jobs that analyze the target data in the selected message to determine target databases to record data associated with the selected message. The job stores the associated record data in the appropriate target databases, and a message processing rate is determined for that job. Using the message processing rate for all of the jobs, the total number of messages that the jobs are able to process in a predetermined period is determined. The current number of pending messages is also determined. An efficiency parameter is determined by subtracting the total number of messages that the jobs are able to process from the current number of pending messages. An additional job is started when the efficiency parameter is less than a predetermined threshold, or a job is removed when the efficiency parameter is greater than another predetermined threshold.

The system and method disclosed in the present disclosure include a processor operably coupled to a memory configured to store a message log table and a job status table. The message log table records target data for each of a plurality of messages. The job status table stores job data on each of the current plurality of jobs and includes at least a message processing rate for each of the current plurality of jobs.

The processor is configured to receive a plurality of messages electronically from a first external device. Each of the received messages includes target data that indicates where record data included in the message should be stored. For each of the received plurality of messages, the processor stores the target data in the message log table and then begins processing each of the messages. A selected message is processed by the processor using a selected one of the current plurality of jobs by analyzing the target data included in the selected message to determine a plurality of target databases to store the record data associated with the selected message. Once the target databases are identified, the processor electronically stores the associated record data in the determined plurality of target databases using a selected current job. The processor removes the selected message from the message log table when the selected current job completes processing the selected message, and the processor updates the message processing rate in the job status table for the selected one of the current plurality of jobs.

Based on the updates to the message log table and job status table, the processor, in real-time or near-real-time, adjusts the current plurality of jobs. This is done while processing each of the received plurality of messages. The processor adjusts the current plurality of jobs by determining the total number of messages that the current plurality of jobs is able to process in a predetermined period of time. The total number is determined by multiplying the message processing rate for each of the current plurality of jobs by the predetermined period of time and summing the resulting number of messages for each of the current plurality of jobs together. The processor also determines the current number of pending messages by analyzing the target data in the message log table. The processor then determines an efficiency parameter by subtracting the total number of messages from the current number of pending messages. An additional job is started when the efficiency parameter is less than a first predetermined threshold, or a job is stopped when the efficiency parameter is greater than a second predetermined threshold.

In one or more embodiments, the memory also stores a monitoring table comprising telemetry from an active replicator node, which hosts the current plurality of jobs. The telemetry may include such information as a heartbeat signal from the node and the failure rate of each of the jobs hosted by the replicator. When the telemetry indicates that the node is failing or has failed, such as when the heartbeat signal is lost or a failure rate is greater than a predetermined threshold, The processor then performs a failover to a second standby node. Each of the jobs is moved to that standby node, and they resume processing messages there.

The present disclosure leads to several technical improvements to distributed database systems and other related technologies. For example, one or more embodiments of the disclosure allow for high availability and reliability in distributed database systems. The system monitors the processing nodes that perform the replication, and when the nodes begin to fail, the system automatically performs failover to another node. By monitoring the processing nodes and performing automatic failover, the distributed database can have high availability and reliability since unexpected failures are avoided, and failover may occur with little or no resulting disruption of the replication.

The present disclosure also leads to technical improvements to distributed database systems, such as efficiently providing data replication with high availability by performing real-time monitoring of data replication. Real-time monitoring involves tracking the status and performance of data replication activities. This includes observing metrics such as message volume, processing speeds, latency, and error rates, among others. By having updated data on these parameters, the system can make informed decisions about resource allocation. Based on the insights gained from real-time monitoring, the system can scale the processing ability of replicator nodes up or down. Scaling up involves increasing the number of jobs or tasks that a replicator node can handle, which can be important during periods of high message volume. Conversely, scaling down reduces the number of jobs, conserving resources during periods of low activity. This dynamic adjustment allows the system to improve performance and resource utilization since only the number of jobs and corresponding computational resources that are needed for the current volume and type of messages are dedicated to data replication at a given time.

The one or more embodiments of the disclosure result in a more reliable and efficient distributed database system. By scaling the number of jobs, only a minimal amount of processing and network capacity is needed to process the current messages while maintaining a desired level of reliability and performance. Replication may occur quickly and accurately while only using minimal processing and network capacity, resulting in less energy needed to power the computing resources. One or more embodiments allow for larger, more complex databases and more distributed databases since the system may handle large volumes of messages accurately with little or no human intervention. This capability is important for modern applications that require the handling of vast amounts of data. The system's ability to process large volumes of data accurately with minimal human intervention is a technical improvement because it reduces the likelihood of human error and improves the system's ability to operate smoothly even under heavy loads. Another technical improvement is the provision of automatic failover and scaling. Automatic failover helps the system to remain operational even if a component fails, thereby increasing the overall reliability of the database system. This feature is particularly important for mission-critical applications where downtime can have negative consequences with respect to data processing and other applications. Automatic scaling allows the system to adjust its resources dynamically based on the current workload. This adaptability allows the system to handle varying levels of demand without requiring manual intervention from human operators. The combination of automatic failover and scaling significantly reduces the need for human intervention. This reduction not only lowers operating costs but also increases the system's reliability.

Certain embodiments of the present disclosure may include some, all, or none of these advantages. These advantages and other features will be more clearly understood from the following drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates one embodiment of a flowchart for performing data replication;

FIG. 4 illustrates one embodiment of a flowchart for increasing or decreasing jobs; and FIG. 5 illustrates one embodiment of a flowchart for performing failover.

DETAILED DESCRIPTION

As described above, conventional solutions for replicating data from a source database to a target database are inefficient and unable to automatically cope with real-time changes to the type of data that needs to be duplicated, the amount of data that needs to be duplicated, and the functioning of the replicator nodes that perform the replicating. Conventional solutions result in the need to reserve more computing and network capacity than is needed for day-to-day replication. The capacity may not be adequately scaled by administrators because a large, distributed database system performs thousands of replications per second with changes in the type of data being replicated and resulting performance of the replicators changing at very short time scales. Human administrators are simply unable to perform scaling in the time frame that is necessary to operate the system efficiently. Further, when one or more nodes begin to fail, by the time human administrators notice potential problems, the consequences of the resulting failure and time to perform failover may be catastrophic or at least result in inconveniences to the end-users of the databases.

One or more embodiments of the disclosure provide a solution to these deficiencies by providing real-time automatic monitoring of the data replication and automatic scaling up and down of the number of jobs that perform processing of the messages that are used to transfer the data from the source database to the target databases. The one or more embodiments also provide real-time monitoring of the replicator nodes to determine when failover is needed from an active node to a standby node. By performing both automatic scaling and failover when performing replication, less computational capacity is needed while high reliability and lower downtime are achieved compared to the conventional solutions.

System, Overview

Figure 1:
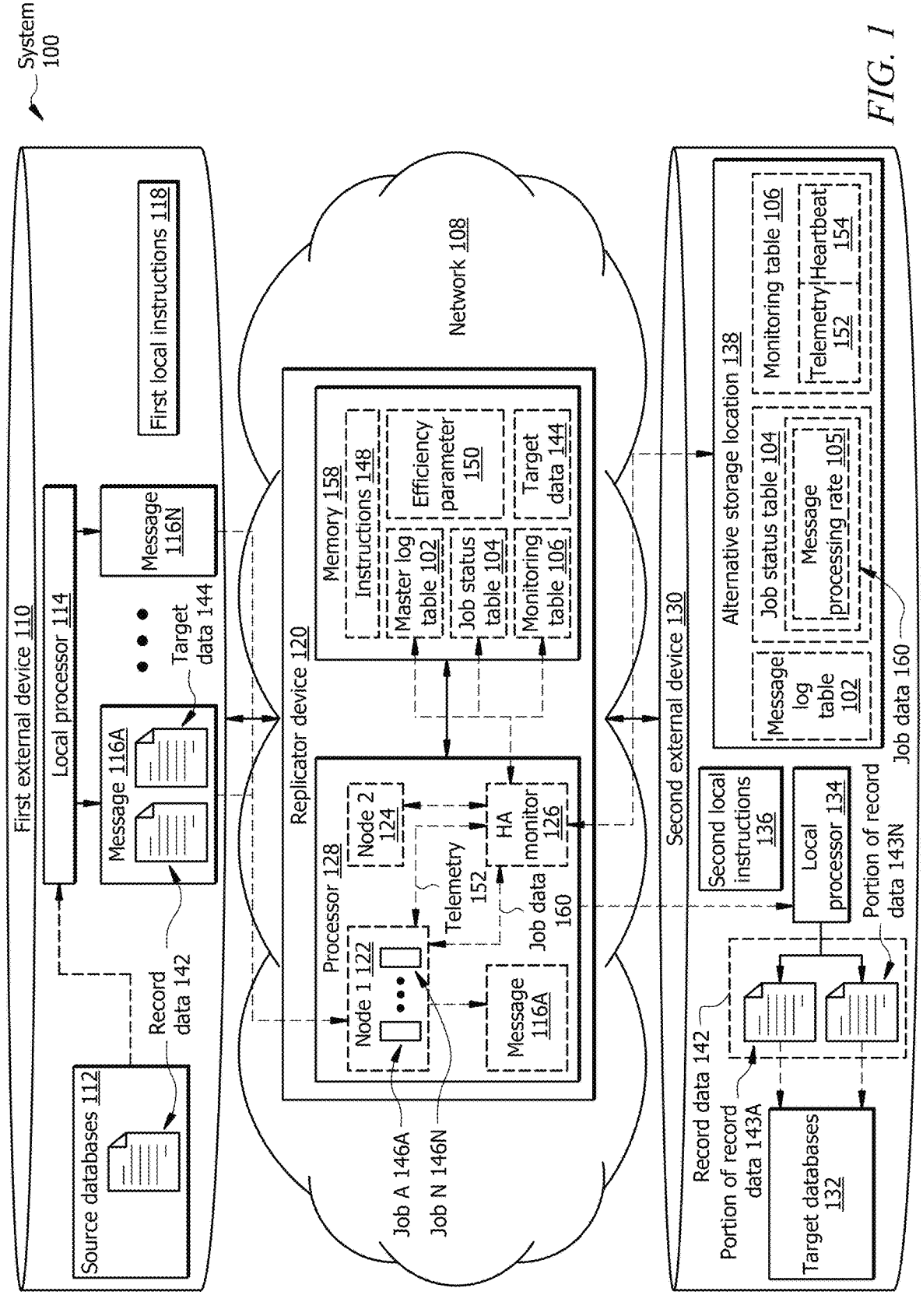
FIG. 1 illustrates one embodiment of a system configured to perform data replication from a source database to a target database.

FIG. 1 illustrates one embodiment of a distributed database system 100 configured to perform data replication from source databases 112 on a first external device 110 to target databases 132 on one or more second external devices 130. The distributed database system 100 also includes a replicator device 120 that includes a memory 158 operatively connected to one or more processors 128 that performs data replication from the source databases 112 to the target databases 132. The processor 128 hosts a plurality of nodes 122 and 124, with a first node 122 operating as an active node 122 and a second node 124 operating as a standby node 124. The active node 122 hosts a plurality of jobs 146A-146N that process messages 116A-116N from the first external device 110 to replicate the record data 142 associated with the messages 116A-116N on the second external device 130. Processor 128 also performs high availability (HA) monitoring 126 to perform real-time monitoring of the jobs 146A-146N and the active node 122 and make appropriate adjustments to the jobs 146A-146N and the active node 122, as will be described below and with regards to FIGS. 2-5, to ensure high availability and reliability. The disclosure is not limited to the configuration shown in FIG. 1.

System Components

First External Device

The first external device 110 may include any number of devices that host one or more source databases 112. The first external device 110 communicates through a network 108 with one or more second external devices 130 as well as a replicator device 120. While only one first external device 110 is shown, in one or more embodiments, a plurality of first external devices, e.g., 110, may be present, each hosting different or duplicate copies of the one or more source databases 112. The first external device 110 may be stored on a standalone computing device such as a server and/or may be part of an organization's data center or located on a private or public cloud server. The first external device 110 may take any form without departing from the disclosure.

In one or more embodiments, the first external device 110 may be a system of record (SOR) and maintain copies of the record data 142 in the source databases 112 that are static or alternatively only changed or updated periodically, such as once a day or once a week or any other useful predetermined time period. In one or more embodiments, the jobs 146A-146N access the record data 142 stored in the source database 112 of the first external device 110 as read-only during regular operation. In or more embodiments, there may be a plurality of first external devices, e.g., 110 that are geographically dispersed and maintain a duplicate of the source databases 112 to ensure redundant storage of the data and protection for the data from any one particular first external device, e.g., 110 being compromised. For example, in a non-limiting example, customer profile data used for performing one or more transactions may be stored in the source database 112; since loss of this data would stop an organization from performing the one or more transactions, there may be a duplicate first external device 110 positioned in another geographic location that the organization does business so if something happens to the first external device 110 a second external device, e.g., 110 may still provide the data. The disclosure is not limited to any particular number of first external devices, e.g., 110, or distribution of the first external devices 110.

Each external device 110 hosts one or more source databases 112. The source databases 112 store record data 142 for various applications and uses. The same record data 142, for example, a customer's name, may be stored in multiple source database 112, while other information, for example, an application-specific user configuration, may only be stored in a single source database 112. The record data 142 may be stored in a file system or in a database-specific system. The source database 112 may be stored in a memory or other storage such as one or more disks, hard drives, tape drives, or solid-state drives. Alternatively, or in addition, the source databases 112 may be part of one or more cloud storage devices. Record data 142 may be stored and recalled using known protocols such as SQL, XML, and/or any other protocol or language that a user, administrator, or developer of the system 100 wishes to use.

The first external device 110 may include at least one local processor 114 that performs one or more processes or operations, including retrieving record data 142 from the source databases 112, associating the record data 142 with target data 144 to produce a message, e.g., 116A and sending it through the network 108 for replication and/or storage in the target databases 132. The local processor 114 executes the first local instructions 118 to perform one or more actions, including retrieving the record data 142 for replication. In one or more embodiments, the local processor 114 uses Kafka, MQ, or other similar applications to determine what record data 142 is needed, package it into an appropriate plurality of messages 116A-116N and send it to a replicator device 120 to process and store the record data 142 included in the messages 116A-116N in the proper target databases 132.

While FIG. 1 shows the first external device 110, including only a single processor 114 and source database 112, the first external device 110 may include any suitable number and combination of processors, e.g., 114, databases, e.g., 112, and may also include separate memories or storage for storing such things as first local instructions 118 and/or data related to the messages, e.g., 116A. For simplicity, only one processor, e.g., 114, and one source database 112 are shown in FIG. 1.

Second External Device

The second external device 130 may include any number of devices that host or keep copies of the record data 142 on one or more target databases 132. The second external device 130 communicates through a network 108 with one or more first external devices 110 as well as a replicator device 120. While only one-second external device 130 is shown, in one or more embodiments, a plurality of second external devices, e.g., 130, may be present, each hosting different or duplicate copies of the one or more target databases 132. The second external device 130 may be stored on a standalone computing device such as a server and/or may be part of an organization's datacenter or located on a private or public cloud server. The second external device 130 may be similar or the same as the first external device 110, or it may take a different form, such as, for example, being an edge server or a local server. In one or more embodiments, there are more second external devices 130 than first external devices 110. The second external device 130 may take any form and there may be any number of second external devices 130 without departing from the disclosure.

In one or more embodiments, the second external device 130 may be a system of access (SOA) that includes one or more target databases 132 that store dynamic copies of the record data 142 and/or portions of the record data 143A-143N. The second external device 130 and the target databases 132 hosted by the second external device 130 may provide data as needed to other applications (not shown) and/or devices (not shown) through the network 108 in real-time or near real-time. The target databases 132 may also be frequently changed or altered by other applications (not shown) and/or devices (not shown). This may include purging record data 142 when not needed and requesting copies of the record data 142 at the instant it is required or is predicted to be needed. Accordingly, the target databases 132 may need to be frequently updated or corrected with record data 142 from a more stable SOR database such as the source databases 112 located on the first external device 110. As described below and with regards to FIGS. 2-5, when the target database 132 needs new or updated record data 142, a replicator device 120 receives one or more messages 116A-116N that update the target database 132.

The record data 142 in a similar manner to the first external device 110 may be saved in the second external device 130 to one or more target databases 132 using a file system or in a database-specific system. The target databases 112 may be stored in a memory or other storage such as one or more disks, hard drives, tape drives, or solid-state drives. Alternatively, or in addition, the target databases 132 may be part of one or more cloud storage devices or edge storage devices. Record data 142 or a portion of the record data, e.g., 143A, may be stored and recalled using known protocols such as SQL, XML, and/or any other protocol or language that a user, administrator, or developer of the system 100 wishes to use.

The second external device 130 may include at least one local processor 134 that performs one or more processes or operations, including storing record data 142 and/or one or more portions of the record data 143A-143N received from the first external device 110 through the replicator device 120 and network 108 for replication and/or storage in the target databases 132. The local processor 134 executes second local instructions 136 to perform one or more actions, including retrieving the record data 142 for replication. In one or more embodiments, the local processor 134 uses Kafka, MQ, or other similar applications to process record data 142 received from the replicator device 120 to process and store the record data 142 included in the messages 116A-116N in the appropriate target databases 132.

The second external device 130 includes an alternative storage location 138 in one or more embodiments. The alternative storage location 138 may store the message log table 102, job status table 104, and monitoring table 106 on the second external device 130 instead of a memory 158 associated with the replicator device 120 located elsewhere in network 108. Further, in one or more embodiments, the replicator device 120 itself may be a portion of the second external device 130 and/or the first external device 110. The message log table 102, job status table 104, and monitoring table 106 may be located on any of the first external device 110, the second external device 130, and memory 158.

While FIG. 1 shows the first external device 110, including only a single local processor 134 and target databases 132, the second external device 130 may include any suitable number and combination of processors, e.g., 136, target databases, e.g., 132. It may also include separate memories or storage for storing such things as second local instructions 136 and/or data related to the messages, e.g., 116A. For simplicity, only one processor, e.g., 134, and one target database 132 are shown in FIG. 1.

Network

The network 108 may be any suitable type of wireless and/or wired network including, but not limited to, all or a portion of the Internet, an intranet, a private network, a public network, a peer-to-peer network, the public switched telephone network, a cellular network, a local area network (LAN), a metropolitan area network (MAN), a wide area network (WAN), and a satellite network. The network 108 may be configured to support any suitable type of communication protocol as would be appreciated by one of ordinary skill in the art.

The network 108 may connect the first external device 110, a second external device 130, and the replicator device 120. Network 108 may connect the processor 128, memory 158, first external device 110, and second external device 130 through the Internet or other large networks. In one or more embodiments, different elements of system 100 may be at different geographic locations and connected through network 108. While shown as a single network 108, the network 108 may comprise a plurality of components of any suitable networking equipment, including but not limited to routers and switches, that allow at least the first external device 110 and the second external device 130 to communicate with the replicator device 120 and/or its processor 128 and memory 158. Network 108 is not limited to the configuration shown in FIG. 1, which is shown in this form for simplicity and explanatory purposes.

Replicator Device

In one or more embodiments, a replicator device 120 is provided in the network 108 or in one or more of the first external devices 110 and/or second external devices 130. The replicator device 120 performs data replication from source databases 112 to target databases 132. The replicator device 120 may include one or more processors 128 that process messages 116A-116N received from the first external device 110. The replicator device 120 determines which target databases 132, based on target data 144 included in the messages 116A-116N, to store the record data 142 included in the messages 116A-116N. The replicator device 120 may also include a memory 158, which is operatively coupled to the processor 128 and stores instructions 148, as well as data needed for performing replication and HA monitoring 126.

Memory 158 may be any type of storage for storing a computer program comprising instructions 148, message log table 102, job status table 104, monitoring table 106, efficiency parameters 150, and target data 144. The memory 158 may be a non-transitory computer-readable medium in operative communication with the processor 128. The memory 158 may be one or more disks, tape drives, or solid-state drives. Alternatively, or in addition, the memory 158 may be one or more cloud storage devices. The memory 158 may be volatile or non-volatile. It may comprise read-only memory (ROM), random-access memory (RAM), ternary content-addressable memory (TCAM), dynamic random-access memory (DRAM), and static random-access memory (SRAM). In one or more embodiments, the memory 158 and/or the data and tables related to it are stored in the replicator device 120. Alternatively, in one or more other embodiments, at least the message log table 102, job status table 104, and monitoring table 106 may be stored in an alternative storage location 138, such as on the second external device 130.

The memory 158 stores instructions 148, which, when executed by the processor 128, causes the processor 128 to perform the operations shown in FIGS. 2-5 described below. Instructions 148 may comprise any suitable set of instructions, logic, rules, or code. Memory 158 may include storage that may take the form of a database for storing things such as the message log table 102, job status table 104, monitoring table 106, target data 144, efficiency parameter 150, and any other data that the processor 128 needs for replicating the messages 116A-116N and performing HA monitoring 126. These may be stored and recalled using known protocols such as SQL, XML, and/or any other protocol or language that a user, administrator, or developer of the system 100 wishes to use. The instructions 148, message log table 102, job status table 104, monitoring table 106, target data 144, efficiency parameter 150, and any other information stored in memory 158 may be stored in different forms. The disclosure is not limited to storing the instructions 148 as a database or in any other form without departing from the disclosure.

The memory 158, in one or more embodiments, stores the message log table 102. The message log table 102 stores target data 144 for each of the plurality of messages, e.g., 116A. This target data 144 may be determined by the local processor 114 of the first external device 110 or may be the result of a request received from the second external device 130 and/or end-user device (not shown) that requests record data 142 from a source database 112. Each message, e.g., 116A, includes record data 142 and target data 144 in one or more embodiments. The target data 144 may take the form of metadata describing various aspects of the record data 142, such as origin, type, creation date, intended use, permissions, and other useful data. From the target data 144 stored in the message log table 102, the processor 128 performing replication using a job, e.g., 146A, may determine which target databases 132 and/or where in the target databases 132 the record data 142 or a portion of the record data 143A associated with a message, e.g., 116A should be stored.

The memory 158 in one or more embodiments also stores a job status table 104. The job status table 104 stores job data 160 or performance data on each of a current plurality of jobs 146A-146N. This job data 160 or performance data includes such things as a message processing rate 105 for each of the jobs 146A-146N. The message processing rate 105 details how many messages for a set predetermined period of time each job, e.g., 146A is able to process. For example, if the predetermined period of time is a second, a particular job, e.g., 146A, may be able to process five hundred messages, e.g., 116A-116N per second, while a second job, e.g., 146N, may be able to process two thousand messages, e.g., 116A-116N. The set predetermined period of time in one or more embodiments may be a second, ten seconds, a minute, or any other applicable predetermined period that is determined by an administrator, developer, or other concerned party. The predetermined period of time may be selected based on an acceptable latency rate for the database system; for example, a system 100 transferring music files from the first external device 110 to the second external device 130 may have a longer predetermined period due to latency being less critical than that of a system 100 that transfers data for financial purposes. The set predetermined period of time may be any predetermined period, and the disclosure is not limited by any particular period.

In one or more embodiments, the memory 158 also stores a monitoring table 106. The monitoring table 106 stores telemetry 152 from an active replicator node 122. This telemetry 152 includes a heartbeat signal 154 as well as data on the failure rate of each job, e.g., 146A. As will be described below and in more detail with regard to FIG. 5, the processor 128 uses the information stored in the monitoring table 106 and/or data from the telemetry 152 received from each replicator node 122 and 124 to perform a failover of the jobs 146A-146N to a standby node 124.

The processor 128 uses the data stored in the memory 158 or in the alternative storage location 138 to perform replication of data from one or more source databases 112 to one or more target databases 132 as will be described below and in more detail with regards to FIGS. 2-5. The processor 128 hosts an active node 122 and a standby node 124 that host jobs 146A-146N that perform replication of the record data 142 stored on the source database 112. The processor 128 also hosts a high availability (HA) monitor 126, which monitors the active node 122 to perform real-time scaling of the number of jobs 146A-146N and failover of the active node 122 to the inactive node 124 when needed.

The processor 128 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 128 may be a programmable logic device, a microcontroller, a microprocessor, or any suitable combination of the preceding. The processor 128 is communicatively coupled to and in signal communication with the memory 158. The one or more processors making up the processor 128 are configured to process data and may be implemented in hardware or software. For example, the processor 128 may be 8-bit, 16-bit, 32-bit, 64-bit, or of any other suitable architecture. The processor 128 may include an arithmetic logic unit (ALU) for performing arithmetic and logic operations, processor registers that supply operands to the ALU and store the results of ALU operations, and a control unit that fetches instructions 148 from memory 158 and executes them by directing the coordinated operations of the ALU, registers and other components.

The processor 128 is in operative communication with memory 158 and configured to implement various instructions 148 stored in the memory 158. The processor 128 may be a special-purpose computer designed to implement the instructions 148 and/or functions disclosed herein. For example, the processor 128 may be configured to perform operations, including those described below and shown in FIGS. 2-5.

The processor 128 receives the messages 116A-116N from the first external device 110 over the network 108. Each message, e.g., 116A, is processed by one of the current plurality of jobs 146A-146N, as will be described in more detail with regards to FIG. 3. Each message, e.g., 116A is assigned to a particular job 146A based on a predetermined criteria such for example, in a non-limiting example, assigning a message, e.g., 116A to the job, e.g., 116A that has the least number of messages, e.g., 116A in its queue. Once a particular message, e.g., 116A, is assigned to a job, e.g., 146A or the replicator node 122, the processor 128 performing the job, e.g., 146A analyzes the target data 144 to determine where the particular message 116A should have its record data 142 or portion of the record data 143A-143N to the target databases 132. Any particular message 116A may include multiple portions of record data, e.g., 143A. A particular portion of the record data 143A may be assigned to a first target database 132, while a second portion of the record data 143N may be assigned to a different target database 132. Further, the record data 142 and/or its portions, e.g., 143A, may be assigned to multiple second external devices 130 and/or combinations of second external device 130 and target databases 132.

While the jobs, e.g., 146A-146N, process messages 116A-116N, the processor performs HA monitoring 126. When performing HA monitoring 126, the processor determines the current number of pending messages 116A-116N and the number of messages 116A-116N that the current jobs 146A-146N are able to process during the predetermined period. The number of messages 116A-116N that the current jobs 146A-146N are able to process are determined by multiplying the message processing rate for each of the jobs 146A-146N by the predetermined time and summing the resulting number of messages, e.g., 116A together. The number of messages 116A-116N that the current jobs 146A-146N are able to process is then subtracted from the current number of pending messages to calculate an efficiency parameter 150. This efficiency parameter 150 is compared to a first and second threshold or a percentage to determine if more jobs 146A-146N are needed or fewer jobs 146A-146N are needed as described below with regards to FIG. 4. If the efficiency parameter 150 is less than a first predetermined threshold, an additional job 146N may be started, and messages 116A-116N will be reassigned to the new job, e.g., 146N. If the efficiency parameter 150 is greater than a second predetermined threshold, then one of the jobs, e.g., 146N is stopped, and its messages 116A-116N are reassigned to the remaining jobs 146A-146N. Once either a new job, e.g., 146N, is started or an old job, e.g., 146N, is stopped, the processor 128 performing HA monitoring 126 recalculates the efficiency parameter 150, and additional changes to the number of jobs 146A-146N are made.

Also, while the jobs, e.g., 146A-146N process messages 116A-116N, the processor 128 performing HA monitoring 126, monitors the active node 122 using data from the monitoring table 106 and/or information contained in the telemetry 152 as will be described in more detail below with regards to FIG. 5. The processor 128 determines if a heartbeat signal 154 is present or if the total number of failures for all the messages being processed by the node 122 is greater than a predetermined threshold. If the heartbeat signal 154 is missing or the total number of failures is greater than the predetermined threshold, the processor 128 performs a failover from the first or currently active node 122 to the second or standby node 124.

While only one active node 122 and one standby node 124 are shown, the number of nodes may be greater than that shown in FIG. 1 without departing from the disclosure. Similarly, the jobs 146A-146N may be located on more than one node, e.g., 122, and there may be more or fewer jobs 146A-146N than described and shown in FIG. 1. The system 100 of FIG. 1 may perform one or more of the methods described below with regard to FIGS. 2-5 or the system 100 may perform other methods without departing from the disclosure.

Figure 2:
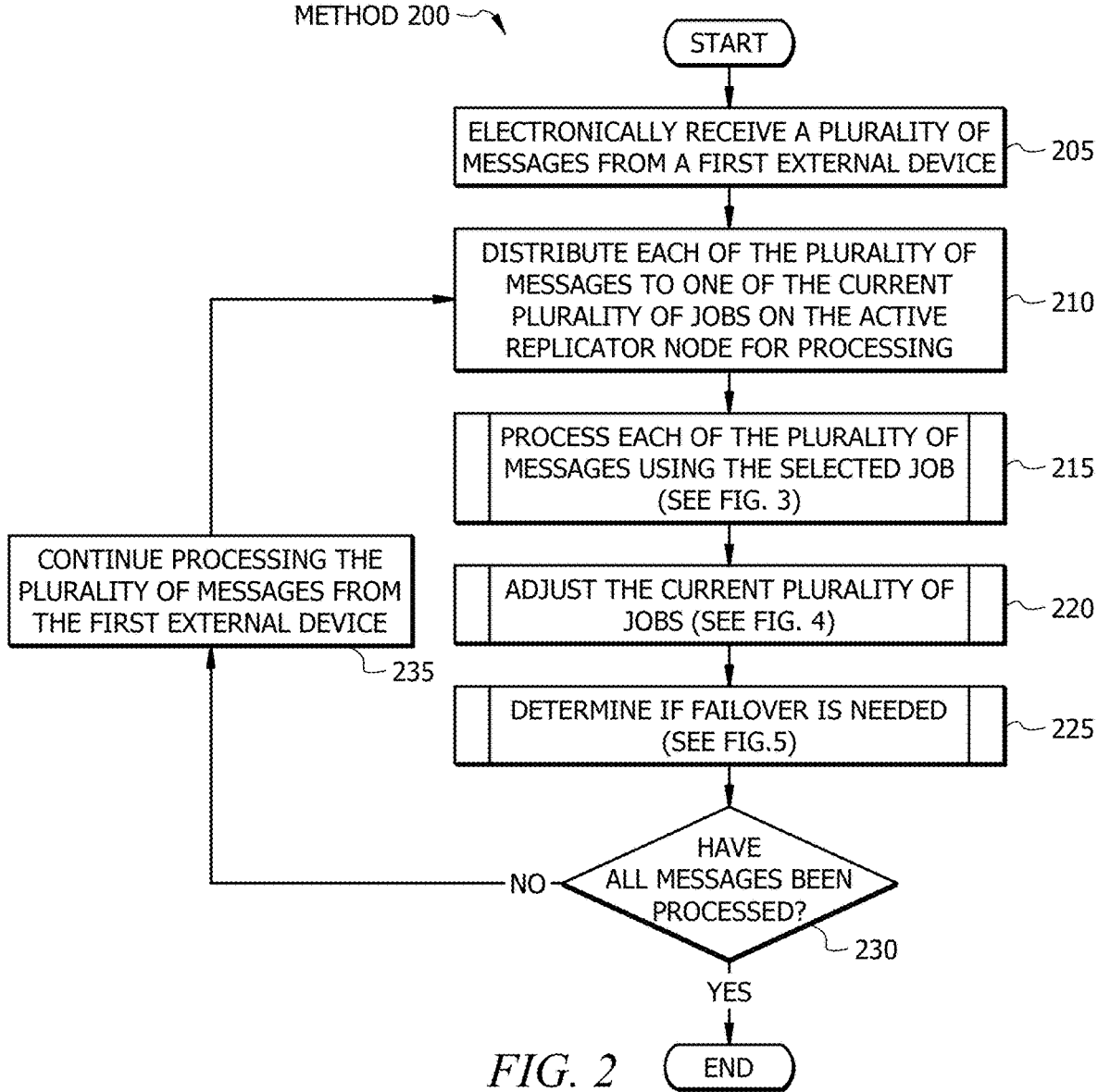
FIG. 2 illustrates one embodiment of a flowchart for real-time monitoring of data replication for high availability.

Process for Performing Real-Time Monitoring of Data Replication for High Availability FIG. 2 is a flowchart of an embodiment of method 200 performed by a processor 128 for performing real-time monitoring of data replication for high availability in a distributed database system, e.g., 100. The processor 128 may execute instructions 148 stored in memory 158, which employs method 200 for processing messages, e.g., 116A received from a first external device and recording their data 142 in the appropriate target databases 132.

Method 200 begins at operation 205 when processor 128 electronically receives a plurality of messages, e.g., 116A from a first external device 110. The first external device 110 may be a data center, cloud device, or any other computational device that may support one or more source databases 112. The source databases 112 in one or more embodiments may be SOR databases and maintain record data 142 that is infrequently or never changed. The messages, e.g., 116A, include record data 142 and target data 144. The target data 144 may take the form of metadata or other routing data, which, as has previously been described and will be described in more detail below, is used for determining which target databases 132 the job, e.g., 146A processing the message, e.g., 116A should store the record data 142.

Once the processor 128 receives the plurality of messages, e.g., 116A, in operation 205, the processor 128 in operation 210 distributes each of the plurality of messages, e.g., 116A, to one of the current plurality of jobs, e.g., 146A, on the active replicator node, e.g., 122. The messages, e.g., 116A, may be distributed by the processor 128 based on predetermined criteria such as first in, first out, or based on which job, e.g., 146A, has the most unused capacity. Other criteria may be used, and the disclosure is not limited to first in, first out, or which jobs, e.g., 146A, have the most unused capacity.

Once the processor 128 distributes each of the plurality of messages, e.g., 116A in operation 210, the process processes each of the plurality of messages, e.g., 116A messages, using the selected job, e.g., 146A in operation 215. In one or more embodiments, this may be done as described below with regards to method 300 shown in FIG. 3. However, the jobs, e.g., 146A, may process the messages, e.g., 116A in any manner without departing from the disclosure and the disclosure is not limited to the method 300 described below with respect to FIG. 3.

Once processor 128 finishes or at the same time as processing each of the plurality of messages, e.g., 116A using the selected job, e.g., 146A in operation 215, the processor 128 adjusts the current plurality of jobs, e.g., 146A in operation 220. In one or more embodiments, this may be done as described below regarding the method 400 described in FIG. 4. However, the processor 128 may adjust the current plurality of jobs, e.g., 146A, using any method without departing from the disclosure. The disclosure is not limited to method 400, as described below, with respect to FIG. 4.

Once processor 128 finishes or at the same time as adjusting the current plurality of jobs, e.g., 146A in operation 220, the processor 128 determines if failover is needed in operation 225. When assessing if failover is required in operation 225, processor 128 uses the monitoring table 106 and/or telemetry 152 from the active node 122 to determine if failover from the active node 122 to the inactive node 124 is necessary. Operation 225 in one or more embodiments may be performed as described below with regards to the method 500 described in FIG. 5. However, the processor 128 may determine if failover is needed using any process without departing from the disclosure, and the disclosure is not limited to the method 500 described below with respect to FIG. 5.

In one or more embodiments, operations 215-225 are performed simultaneously. As the processor processes each of the plurality of messages, e.g., 116A, the message log table 102 and job status table 104 are updated; these are then used by the processor 128, which continuously monitors the status of the job, e.g., 146A to adjust the current plurality of jobs in operation 220. The processor 128 also uses the telemetry 152 and other data in the monitoring table 106 to determine if failover is needed in operation 225. These operations 215-225 are repeated for each message, e.g., 116A, and in operation 230, the processor 128 determines if all the messages, e.g., 116A, have been processed. If so, the method 200 ends. Otherwise, the processor 128 continues in operation 235, processing the plurality of messages, e.g., 116A, received from the external device, and operations 210-235 repeat until all the messages, e.g., 116A, have been processed. In one or more embodiments where the source databases 112 are particularly large, or the information is needed at all hours, operations 205-235 may continuously be performed by the processor 128 with the method 200 only ending when the first external device 110 is taken offline or for other reasons initiated by a user, administrator, operator, manufacturer, or other concerned party. This may occur when the databases are moved to other servers and/or reconfigured in such a way that replication is no longer needed.

Process for Performing Data Replication

FIG. 3 is a flowchart of an embodiment of method 300 performed by a processor 128 for performing data replication of messages, e.g., 116A from source databases 112 to one or more target databases 132. The processor 128 may execute instructions 148 stored in memory 158, which employs method 300 for performing data replication in a distributed database system 100.

Method 300 in one or more embodiments is performed as part of operation 215 of method 200. Alternatively, in one or more embodiments, method 300 may be performed as part of any other methods or stand-alone. The method 300 begins at operation 305 when processor 128 retrieves the target data 144 associated with the selected message 116A from the memory 158, or alternatively, the target data 144 is retrieved directly from the first external device 110. The target data 144 may include metadata or other data that a selected job, e.g., 146A, may use to determine where the record data 142 should be stored. In one or more embodiments, the record data 142 may include one or more portions 143A-143N, and each portion, e.g., 143A, may need to be stored in one or more different target databases 132. Alternatively, all of the record data 142 may be indicated by the target data 144 to need to be saved in the same target database 132 or a plurality of target database 132 that store copies of the record data 142. The number of portions, e.g., 143A, and the number and configuration of target databases 132 are specific to the particular message, e.g., 116A and the particular configuration of the distributed database system 100, and the disclosure is not limited to one particular configuration.

Once the target data 144 associated with the selected message, e.g., 116A is retrieved from the memory 158 or the first external device 110 in operation 305, the processor 128 in operation 310 determines using a selected one of the current plurality of jobs, e.g., 146A, which target databases 132 each portion of the record data, e.g., 143A associated with the selected message, e.g., 116A should be stored based on the target data 144. The selected job, e.g., 146A, analyzes the target data 144 to determine where the entire record data 142 or each portion of the record data, e.g., 143A, should be stored. As previously discussed, the record data 142 may need to be recorded in multiple target databases 132, for example, where there may be multiple external devices 130 that are geographically dispersed that host the same target database 132. Accordingly, the selected one of the current plurality of jobs 146A may determine that the record data 142 should be recorded in one or more identical target databases 132 that are on each of the multiple external devices 130. Alternatively, only one target database, 132, may need to be updated while others do not; the selected one of the current plurality of jobs, e.g., 146A, would also be able to make this determination from the target data 144. In one or more embodiments, the target data 144 may indicate that a portion of the record data 143A should be stored on any combination of target database 132 and a second external device 130 without departing from the disclosure.

Once the specific target databases are determined by the processor 128 performing a selected one of the current plurality of jobs, e.g., 146A in operation 310, the selected one of the current plurality of jobs, e.g., 146A electronically stores each portion of the record data 143A-143N to the appropriate target database 132 in operation 315. In one or more embodiments, this may comprise sending the record data 142 across the network 108 to a second external device and its local processor 134, which writes the data to the appropriate target database 132. Alternatively, the replicator device 120 and/or processor 128 may be located on the second external device 130. Then, the processor 128, performing the selected one of a current plurality of jobs, e.g., 146A, stores the record data 142 to the target database 132 directly or through a local network (not shown).

Once the processor 128 performing the selected one of the current plurality of jobs, e.g., 146A in operation 315, begins electronically storing the record data 142 to the appropriate target databases 132, a determination is made if each portion or all of the record data 142 was stored successfully to the target databases 132 in operation 320. If it was not, the processor 128 restarted the processing of the selected message, e.g., 116A, and indicates in the monitoring table 106 that the selected one of the current plurality of jobs failed to process the selected message, e.g., 116A in operation 330. This information is later used by the processor 128 to determine if the failover is needed, as described below, regarding method 500, as shown in FIG. 5.

Once operation 330 is performed, the processor 128 repeats operations 305-320 until each portion of the record data 143A-143N is stored successfully in the target database 132. When each portion of the record data, 143A-143N, is stored successfully, the processor 128 updates the message processing rate to 105 in the job status table 104 in operation 325. The selected message is also removed from the message log table 102 when the selected one of the current plurality of jobs, e.g., 146A, completes processing the selected message, e.g., 116A. Once the message processing rate 105 in the job status table 104 for the selected one of the current plurality of jobs, e.g., 146A, is updated in operation 325, the method 300 of FIG. 3 returns to operation 220 of FIG. 2. Alternatively, where method 300 is stand-alone, the method 300 may end after operation 325.

Process for Increasing or Decreasing Jobs

FIG. 4 is a flowchart of an embodiment of method 400 performed by a processor 128 for increasing or decreasing the number of jobs 146A-146N hosted by a node 122 for processing messages 116A-116N. The processor 128 may execute instructions 148 stored in memory 158, which employs method 400 for increasing or decreasing the number of jobs 146A-146N.

Method 400 in one or more embodiments is performed as part of operation 220 of method 200, as shown in FIG. 2. Alternatively, in one or more embodiments, method 400 may be performed as part of any other methods or standalone. The method 400 begins at operation 405 when processor 128 determines a current number of pending messages 116A-116N by analyzing the target data 144 in the message log table 102. The message log table 102 includes a list of all of the messages received in operation 205 of method 200 of FIG. 2. In one or more embodiments, the message log table 102 may include much, if not all, of each message, e.g., 116A.

Once the current number of pending messages 116A-116N is determined in operation 405, the processor 128 in operation 410 determines the total number of messages 116A-116N that the current plurality of jobs 146A-146N are able to process in a predetermined period of time. The total number of messages the current plurality of jobs 146A-146N is able to process is determined by using the message processing rate 105 stored in the job status table 104. The processor 128 determines the total number of messages by multiplying the message processing rate 105 times the amount of time comprising the predetermined period of time. This predetermined period of time may be any predetermined amount of time that has been determined to be useful in making an accurate calculation and making an appropriate adjustment to the number of jobs 146A-146N. For example, the predetermined period of time may be one second, one minute, or any other period without departing from the disclosure.

Once the total number of messages the current plurality of jobs is able to process in a predetermined period of time in operation 410 and the current number of pending messages is determined in operation 405, the processor 128 in operation 415 calculates an efficiency parameter 150 by subtracting the total number of messages from the current number of pending messages. This efficiency parameter 150 is then used by processor 128 in operations 420 and 430 to determine how to adjust the current plurality of jobs 146A-146N.

In operation 420, the efficiency parameter 150 is compared with a first predetermined threshold to determine if the efficiency parameter 150 is less than the first predetermined threshold. The first predetermined threshold may be selected based on any criteria. In general, it may be useful to choose a first predetermined threshold that is large enough that additional jobs, e.g., 146A, are not added too frequently but not so low that the system becomes slow or frequently fails. A user, administrator, developer, or any other appropriate party may determine the first predetermined threshold.

Alternatively, the processor 128 may determine and/or adjust the predetermined threshold based on a predetermined percentage of the number of messages 116A-116N that are currently pending. For example, in a non-limiting example, the predetermined percentage of five percent may be selected; if there are currently ten thousand messages pending, then an efficiency parameter may be set at five hundred messages. Any percentage predetermined threshold value may be used, and the disclosure is not limited to those described above.

In operation 420, the processor 128 determines if the efficiency parameter is less than the first predetermined threshold. If it is, in operation 425, an additional job, e.g., 146N, is started and added to the current plurality of jobs 146A-146N, increasing the number of jobs 146A-146N by one. If, however, in operation 420, the efficiency parameter 150 is determined to be greater than the first predetermined threshold, the operation determines if the efficiency parameter 150 is greater than the second predetermined threshold in operation 430.

Similar to the first predetermined threshold, the second predetermined threshold may be selected based on any criteria. In general, it may be useful to choose a second predetermined threshold that is small enough that jobs, e.g., 146A, are not removed too frequently but not so high that too many jobs, e.g., 146A, continue to operate unnecessarily using compute resources and/or network capacity.

In operation 430, the processor 128 determines if the efficiency parameter 150 is greater than a second predetermined threshold. If the efficiency parameter 150 is greater than the second predetermined threshold, the processor 128 then stops one job, e.g., 146N of the current plurality of jobs 146A-146N in operation 435. Any messages, e.g., 116A, currently assigned and/or being processed by the job, e.g., 146N, are reassigned to other jobs, e.g., 146A. Once either an addition job, e.g., 146N, is added in operation 425 or a job, e.g., 146N, is removed in operation 435. The processor 128 recalculates the efficiency parameter 150 based on the adjustment to the current plurality of jobs 440. The method 400 returns to operation 405, and operations 405-440 repeat.

Once the efficient parameter 150 is greater than the first predetermined threshold in operation 420 and less than the second predetermined threshold in operation 430, the messages are continued to be processed using the current plurality of jobs 146A-146N in operation 445. The method 400 of FIG. 4 returns to operation 225 of FIG. 2. Alternatively, where method 400 is stand-alone, the method 400 may end after operation 325.

Process for Performing Failover

FIG. 5 is a flowchart of an embodiment of method 500 performed by a processor 128 for performing failover. The processor 128 may execute instructions 148 stored in memory 158, which employs method 500 for performing failover. In one or more embodiments, method 500 is performed as part of operation 225 of method 200, shown in FIG. 2. Alternatively, in one or more embodiments, method 500 may be performed as part of any other methods or stand-alone.

The method 500 begins at operation 505 when processor 128 retrieves telemetry 152 for the active replicator node 122 from the monitoring table 106 stored in memory 158 or stored in an alternative storage location 138. The processor 128 determines if a heartbeat signal 154 is present in operation 510. The heartbeat signal is sent periodically by the replicator node 122 to indicate that it is functioning. This signal may be stored in the monitoring table 106, or the signal may be monitored in real-time by the processor 128. In operation 515, if the heartbeat signal is present, the processor 128 proceeds to operation 520, where a total number of failures for each message, e.g., 116A, based on data that may have been stored in the monitoring table 106 in operation 330 of FIG. 3. If the total number of failures is not greater than a predetermined threshold in operation 525 the method 500 proceeds to operation 530, wherein the processor 128 continues to use the current replicator node 122. However, if the heartbeat signal 154 is not present in operation 515 or if the total number of failures is greater than a predetermined threshold in operation 525, the method 500 proceeds to operation 535, where the processor 128 performs a failover of the current plurality of jobs 146A-146N to the standby replicator node 124 in operation 535. In operation 535, each of the jobs 146A-146N is transferred to the second standby replicator node 124, and if the replicator node 122 is still functioning, it is shut down.

Either the current replicator node 122 continues to process the messages in operation 530, or the current plurality of jobs 146A-146N failover to the standby replicator in node 124 in operation 535. Once either the current replicator node 122 or the standby replicator node 124 is selected in either operation 535 or 530, method 500 returns to operation 230 of FIG. 2. Alternatively, where method 500 is stand-alone, the method 500 may end after either operations 530 or 535.

The present examples are to be considered illustrative and not restrictive, and the intention is not to be limited to the details given herein. For example, the various elements or components may be combined or integrated into another system, or certain features may be omitted or not implemented.

While several embodiments have been provided in the present disclosure, it should be understood that the disclosed systems and methods might be embodied in many other specific forms without departing from the spirit or scope of the present disclosure. The present examples are to be considered illustrative and not restrictive, and the intention is not to be limited to the details given herein. For example, the various elements or components may be combined or integrated with another system, or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To aid the Patent Office and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory operable to store:
    a message log table, wherein the message log table records target data for each of a plurality of messages; and
    a job status table, wherein the job status table stores job data on each of a current plurality of jobs, wherein the job data includes at least a message processing rate for each of the current plurality of jobs; and
a processor operably coupled to the memory, the processor configured to:
    electronically receive a plurality of messages from a first external device, and for each of the received plurality of messages store the target data in the message log table, wherein each of the plurality of messages includes target data and record data, and the target data indicates where the record data should be stored;
    process each of the received plurality of messages by:
        processing a selected message using a selected one of the current plurality of jobs by analyzing the target data included in the selected message to determine a plurality of target databases to store the record data associated with the selected message;
        electronically storing the associated record data in the determined plurality of target databases;

removing the selected message from the message log table when the selected one of the current plurality of jobs completes processing the selected message; and
        updating the message processing rate in the job status table for the selected one of the current plurality of jobs; and
    adjust the current plurality of jobs while processing each of the received plurality of messages by:
        determining a total number of messages that the current plurality of jobs is able to process in a predetermined period of time based on at least a processing rate for each of the current plurality of jobs;
        determining a current number of pending messages by analyzing the target data in the message log table;
        determining an efficiency parameter by subtracting the total number of messages from the current number of pending messages;
        starting an additional job when the efficiency parameter is less than a first predetermined threshold; and
        adding the additional job to the current plurality of jobs.

2. The system of claim 1, wherein:
the memory stores a monitoring table that comprises telemetry from an active replicator node, which hosts each of the current plurality of jobs; and
the processor is further configured to:
    determine if the telemetry indicates that the active replicator node is failing; and
    transfer the current plurality of jobs to a standby replicator node when the telemetry indicates that the active replicator node is failing.

3. The system of claim 2, wherein the telemetry includes a number of failures for each message and the active replicator node is indicated as failing when the number of failures is greater than a second predetermined threshold.

4. The system of claim 1, wherein the determined plurality of target databases is located on a second external device and wherein the first external device and the second external device are connected to the processor using a network.

5. The system of claim 4, wherein the second external device is one of a plurality of second external devices that each keep copies of the record data, and wherein each of the current plurality of jobs updates each of the plurality of second external devices.

6. The system of claim 1, wherein the first external device is a system of record, and the current plurality of jobs access the system of record as read-only.

7. The system of claim 1, wherein the processor is further configured to adjust the current plurality of jobs by stopping a job when the efficiency parameter is greater than a second predetermined threshold.

8. A method, comprising:
electronically receiving a plurality of messages from a first external device, wherein each of the plurality of messages includes target data and record data, and the target data indicates where the record data should be stored;
storing target data for each of the received plurality of messages in a message log table, wherein the message log table records target data for each of the plurality of messages;

processing each of the received plurality of messages by:

processing a selected message using a selected one of a current plurality of jobs by analyzing the target data included in the selected message to determine a plurality of target databases to store the record data associated with the selected message;

electronically storing the associated record data in the determined plurality of target databases;

removing the selected message from the message log table when the selected one of the current plurality of jobs completes processing the selected message; and updating a message processing rate in a job status table for the selected one of the current plurality of jobs, wherein the job status table stores job data on each of a current plurality of jobs, and the job data includes at least the message processing rate for each of the current plurality of jobs; and adjusting the current plurality of jobs while processing each of the received plurality of messages by:

determining a total number of messages that the current plurality of jobs is able to process in a predetermined period of time based on at least a processing rate for each of the current plurality of jobs;

determining a current number of pending messages by analyzing the target data in the message log table;

determining an efficiency parameter by subtracting the total number of messages from the current number of pending messages;

starting an additional job when the efficiency parameter is less than a first predetermined threshold; and adding the additional job to the current plurality of jobs.

9. The method of claim 8, further comprising:

determining if an active replicator node, which hosts each of the current plurality of jobs, is failing by monitoring telemetry from the active replicator node; and transferring the current plurality of jobs to a standby replicator node when the telemetry indicates that the active replicator node is failing.

10. The method of claim 9, wherein the telemetry includes a number of failures for each message and the active replicator node is indicated as failing when the number of failures is greater than a second predetermined threshold.

11. The method of claim 8, wherein the determined plurality of target databases is located on a second external device.

12. The method of claim 11, wherein the second external device is one of a plurality of second external devices that each keep copies of the record data, and wherein each of the current plurality of jobs updates each of the plurality of second external devices.

13. The method of claim 8, wherein the first external device is a system of record, and the current plurality of jobs access the system of record as read-only.

14. The method of claim 8, further comprising: adjusting the current plurality of jobs by stopping a job when the efficiency parameter is greater than a second predetermined threshold.

15. A non-transitory computer-readable medium storing instructions that, when executed by a processor, cause the processor to:

electronically receive a plurality of messages from a first external device, wherein each of the plurality of messages includes target data and record data, and the target data indicates where the record data should be stored;

store target data for each of the received plurality of messages in a message log table, wherein the message log table records target data for each of the plurality of messages;

process each of the received plurality of messages by:

processing a selected message using a selected one of a current plurality of jobs by analyzing the target data included in the selected message to determine a plurality of target databases to store the record data associated with the selected message;

electronically storing the associated record data in the determined plurality of target databases;

removing the selected message from the message log table when the selected one of the current plurality of jobs completes processing the selected message; and updating a message processing rate in a job status table for the selected one of the current plurality of jobs, wherein the job status table stores job data on each of a current plurality of jobs, and the job data includes at least the message processing rate for each of the current plurality of jobs; and adjust the current plurality of jobs while processing each of the received plurality of messages by:

determining a total number of messages that the current plurality of jobs is able to process in a predetermined period of time based on at least a processing rate for each of the current plurality of jobs;

determining a current number of pending messages by analyzing the target data in the message log table;

determining an efficiency parameter by subtracting the total number of messages from the current number of pending messages;

starting an additional job when the efficiency parameter is less than a first predetermined threshold; and adding the additional job to the current plurality of jobs.

16. The non-transitory computer-readable medium of claim 15, wherein the instructions further cause the processor to:

determine if an active replicator node which hosts each of the current plurality of jobs is failing by monitoring telemetry from the active replicator node; and transfer the current plurality of jobs to a standby replicator node when the telemetry indicates that the active replicator node is failing.

17. The non-transitory computer-readable medium of claim 16, wherein the telemetry includes a number of failures for each message, and the active replicator node is indicated as failing when the number of failures is greater than a second predetermined threshold.

18. The non-transitory computer-readable medium of claim 15, wherein the determined plurality of target databases is located on at least one of a second plurality of external devices that each keep copies of the record data, and wherein each of the current plurality of jobs, updates each of the plurality of second external devices.

19. The non-transitory computer-readable medium of claim 15, wherein the first external device is a system of record, and the current plurality of jobs access the system of record as read-only.

20. The non-transitory computer-readable medium of claim 15, wherein the instructions further cause the processor to adjust the current plurality of jobs by stopping a job when the efficiency parameter is greater than a second predetermined threshold.

* * * * *